(12) United States Patent
Fresco

(10) Patent No.: US 6,827,441 B2
(45) Date of Patent: Dec. 7, 2004

(54) PROGRESSIVE LENS WITH REDUCED DISTORTION

(75) Inventor: Bernard B. Fresco, Toronto (CA)

(73) Assignee: Opticlear Inc., Tortola (VG)

( * ) Notice: Subject to any disclaimer, the term of this patent is extended or adjusted under 35 U.S.C. 154(b) by 52 days.

(21) Appl. No.: 10/059,141

(22) Filed: Jan. 31, 2002

(65) Prior Publication Data

US 2003/0142265 A1 Jul. 31, 2003

(51) Int. Cl.[7] ................................................ G02C 7/06
(52) U.S. Cl. ....................................................... 351/169
(58) Field of Search .................................. 351/168, 172

(56) References Cited

U.S. PATENT DOCUMENTS

| | | | |
|---|---|---|---|
| 1,414,117 A | | 4/1922 | Drescher |
| 4,426,139 A | | 1/1984 | van Ligten et al. |
| 4,806,010 A | * | 2/1989 | Ewer et al. .................. 351/169 |
| 5,048,945 A | | 9/1991 | Ueno et al. |
| 5,110,199 A | | 5/1992 | Ishida |
| 5,294,293 A | | 3/1994 | Jones |
| 5,305,028 A | * | 4/1994 | Okano ......................... 351/169 |
| 5,455,642 A | | 10/1995 | Kato |
| 5,506,630 A | * | 4/1996 | Ueno et al. .................. 351/169 |
| 5,812,237 A | * | 9/1998 | Roddy ........................ 351/169 |
| 5,918,968 A | | 7/1999 | Choi |
| 6,102,544 A | * | 8/2000 | Baudart et al. ............. 351/169 |

FOREIGN PATENT DOCUMENTS

| | | |
|---|---|---|
| DE | 26 44 510 A | 4/1977 |
| FR | 2 419 254 A | 10/1979 |

OTHER PUBLICATIONS

Theo E. Obrig 'Modem Ophtalmic Lenses and Optical Glasses' 1944, The Chifton Company, New York.
Varilux Infinity brochure, p. 3.

* cited by examiner

*Primary Examiner*—Scott J. Sugarman
(74) *Attorney, Agent, or Firm*—Bereskin & Parr

(57) ABSTRACT

A progressive spectacle lens design has clear focal properties in the entire lens, and progressive variation in focal properties from the center of the lens down into a reading area. All current conventional progressive lenses have areas of distortion to the side of the reading area. The present invention provides undistorted optical viewing throughout the entire lens, although the focal length varies.

20 Claims, 7 Drawing Sheets

PROGRESSIVE LENS WITH REDUCED DISTORTION

FIELD OF THE INVENTION

The present invention relates to wearable lenses, and more particularly, the invention relates to multifocal wearable lenses having reduced distortion.

BACKGROUND OF THE INVENTION

Progressive lenses are lenses typically used in eyeglasses to assist wearers who have difficulty with accommodation. The lenses are typically divided into upper and lower portions, wherein the upper portion is designed to improve long-distance vision, and the lower portion is designed to improve intermediate and short distance vision. The lower portion of a progressive lens, the progressive portion, generally comprises a gradually reducing focal length relative to the upper, long-distance portion.

A common problem with progressive lenses is that the vision through the sides of the progressive portion of the lens is distorted, and can cause discomfort and headaches for the wearer. The distortion can cause discomfort for the wearer of the lens, particularly when the wearer moves and the wearer senses the kinetic distortion.

Several types of lens have been devised with the intention of minimizing the problem of distortion.

U.S. Pat. No. 5,455,642 (Kato) discloses a progressive lens having a radius of curvature that varies along the vertical direction. While Kato discloses that the lens provides a wider field of view for astigmatism, relative to lenses of the prior art, the two lower areas of distortion remain a problem for the wearer of the lens.

U.S. Pat. No. 4,426,139 (van Ligten) discloses a progressive lens with a near vision portion, an intermediate vision portion and a far vision portion, employing a cosine function in determining the lens curvature in the transition corridor between the far and near vision portions, so as to reduce the distortion in the peripheral area of the lens.

However there still exists an ongoing need for a lens construction that provides the wearer with an undistorted view through regions of the lens corresponding generally to the wearer's peripheral vision.

SUMMARY OF THE INVENTION

In a first aspect, the present invention provides a multifocal ophthalmic lens having a distance optical center, comprising a first portion having focal properties, said first focal properties being substantially constant throughout said first portion; and a second portion having second focal properties extending downwardly from a location adjacent the distance optical center and having a focal length that varies progressively downwardly in said second portion; and two regions on either side of said second portion, each of said regions having focal properties selected to avoid optical distortion.

The regions, on either side of the second portion, are in conventional lens regions of visual discomfort due to varying focal properties leading to distortion. In the present invention these regions have constant focal properties and these can be one of: the same as the first portion; and different from the first portion. It is preferred for these two regions to have constant focal properties.

In a further aspect, the invention relates to a method of construction of lenses for a wearer with a field of view without regions of potential visual discomfort, wherein the method comprises the steps of:

constructing a long-distance lens piece;

constructing a progressive lens piece that mates with the first lens piece along peripheral edges of both lens pieces;

mating the lens pieces such that the progressive lens piece is substantially outside the regions of potential visual discomfort.

Preferably this technique is used simply to produce a master lens, for creating a mold, with final, production lens being molded in one piece.

BRIEF DESCRIPTION OF THE DRAWINGS

For a better understanding of the present invention and to show more clearly how it may be carried into effect, reference will now be made, by way of example, to the accompanying drawings in which:

FIG. 3b is a side elevation cross-sectional view of an alternate joint to that shown in FIG. 3a;

DETAILED DESCRIPTION OF THE INVENTION

Figure 1:
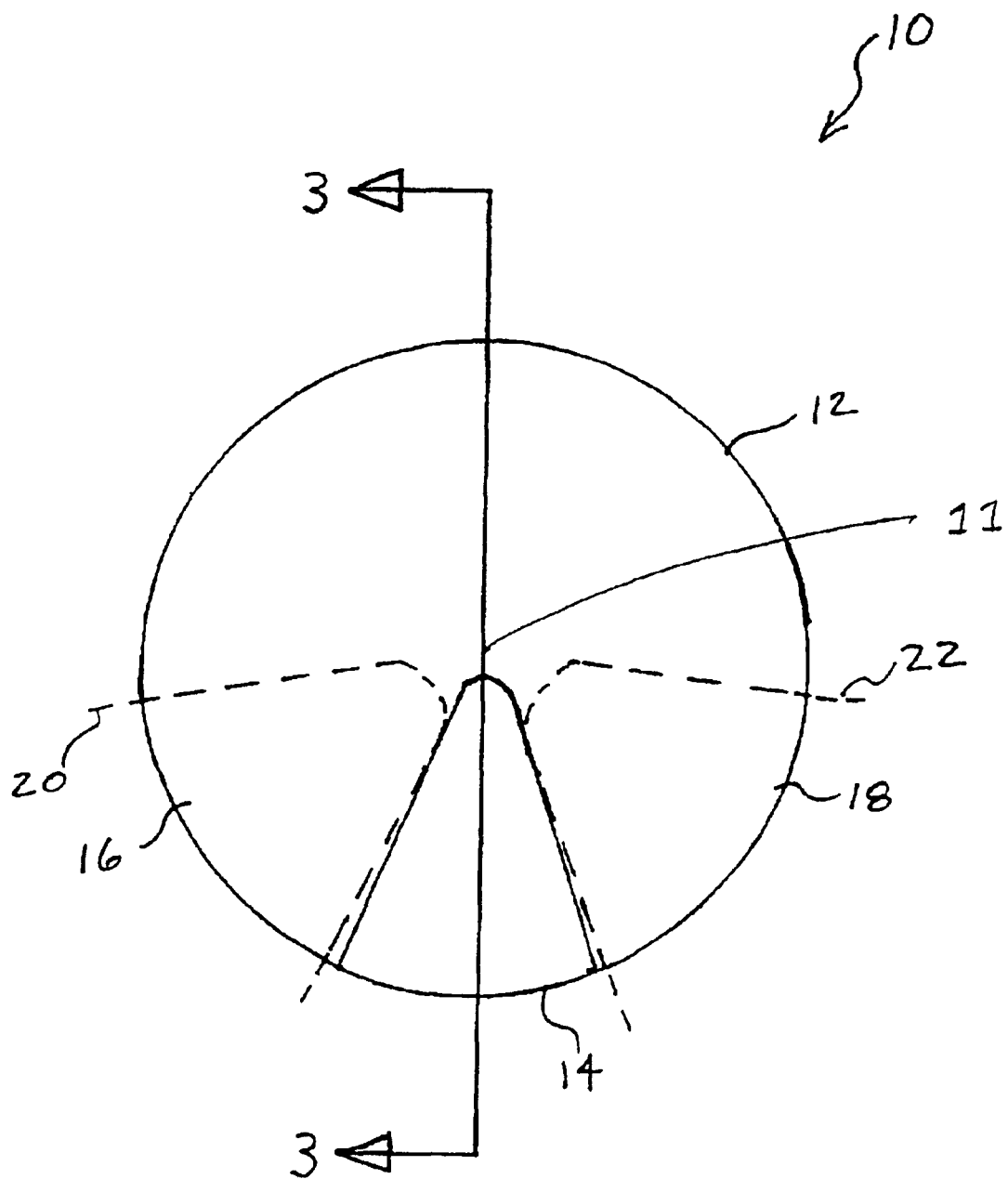
FIG. 1 is a plan view of a lens in accordance with a first embodiment of the present invention.

Reference is first made to FIG. 1, which illustrates a multifocal lens 10 made in accordance with a first embodiment of the present invention, and which will be used for the purposes of describing the operational aspects of the invention. Lens 10 is for use in eyewear, such as eyeglasses or monocles and the like, providing the wearer with improved vision at all ranges of distance: long-distance, intermediate-distance and short-distance.

Lens 10 comprises a long-distance lens piece 12 and a progressive lens piece 14 and has a distance optical center 11. The progressive lens piece 14 extends from a position adjacent the optical center 11 and, in use, provides a reading area or zone. All progressive lenses include two critical regions 16 and 18 which are located on the sides of the lenses, below center and which are delineated by dashed lines 20 and 22. Having either a progressive region or a transition region of a lens anywhere within critical regions 16 and 18, causes a distortion in images seen through critical regions 16 and 18, and can therefore cause discomfort and difficulties for the wearer. Critical regions 16 and 18 are also known as regions of potential for visual discomfort While regions 16 and 18 are high distortion areas in typical prior art lenses, regions 16 and 18 are low distortion areas in lenses in accordance with the present invention such as lens 10, because lens 10 is made so that regions 16 and 18 are outside of progressive piece 14, and have the same focal properties as long-distance piece 12.

Figure 2:
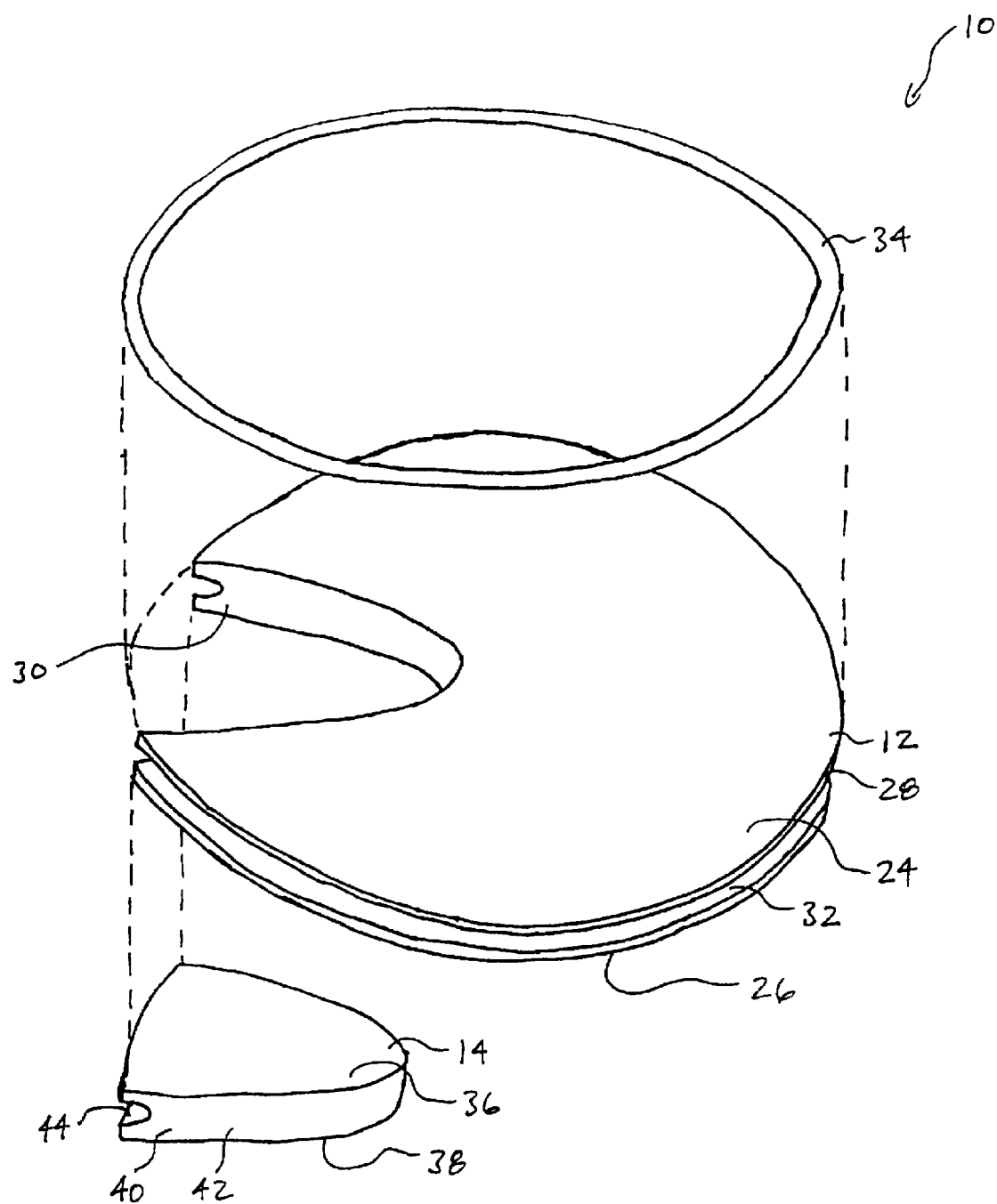
FIG. 2 is an isometric exploded view of the lens in FIG. 1.

Reference is now made to FIG. 2. Long-distance lens piece 12 has front and rear surfaces 24 and 26 which together have focal properties for viewing objects at a relatively long distance. Lens piece 12 is surrounded by an outer edge 28, which includes a mating portion 30 for mating with progressive lens piece 14. A groove 32 for holding an O-ring 34, extends along the length of outer edge 28, outside of mating portion 30.

Progressive lens piece 14 has front and rear surfaces 36 and 38 which together have a range of focal properties for viewing objects at intermediate and short distances. Similarly to lens piece 12, lens piece 14 is surrounded by an outer edge 40 which includes a mating portion 42 for mating with mating portion 30 of long-distance lens piece 12. A groove 44, which aligns with groove 32 on lens piece 12 for holding O-ring 34, extends along the portion of outer edge 40 outside mating portion 42. Mating portion 30 of lens piece 12 may be made by first making a standard lens piece that is initially round, and then cutting out a portion to form lens piece 12. The progressive lens piece 14 can similarly be cut from a larger piece, with corresponding properties. The "cutting out" step may be accomplished using mechanical means, or by a waterjet cutter or a laser cutter, while ensuring that the lens piece is not harmed by the cutting process itself.

Figure 3A:
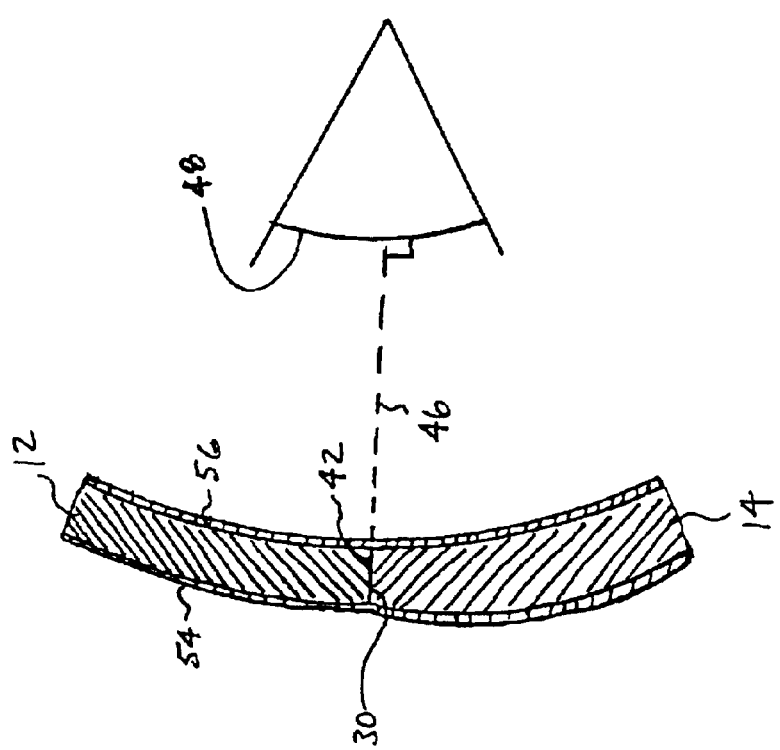
FIG. 3a is a side elevation cross-sectional view of a joint between portions of the lens in FIGS. 1 and 2.
Figure 3B:
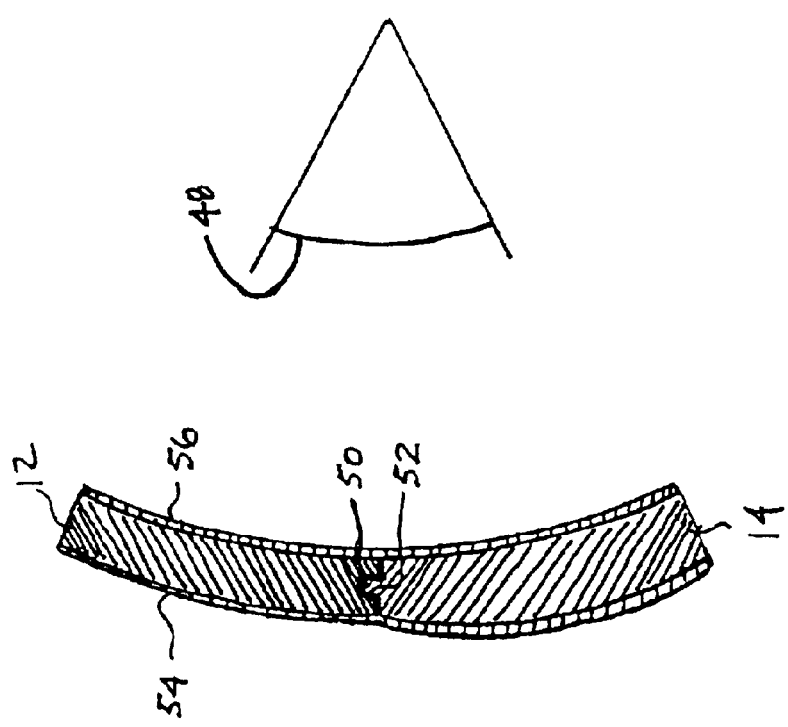

FIGS. 3a and 3b illustrate different methods of joining lens pieces 12 and 14 together. As shown in FIG. 3a, mating portions 30 and 42 are simple edges that are aligned with radial lines 46 from the eye 48 of the wearer of lens 10 so as to minimize interference with the field of view of the wearer. An adhesive may also be used to bond mating lens pieces 12 and 14 together, providing strength to the joint. Alternately, as shown in FIG. 3b, mating portions 30 and 42 may contain a mechanical joint such as a tongue-and-groove, whereby mating portions 30 and 42 have mating male and female portions 50 and 52 which may also be reinforced with an adhesive. As shown in FIGS. 3a and 3b, transparent films 54 and 56 may cover the front and rear surfaces 24, 26, 36 and 38 of lens pieces 12 and 14 to provide further strength at the joint. Transparent films 54 and 56 may be used with any type of mating portions 30 and 42. Transparent films 54 and 56 can be applied in any suitable way and could, for example, comprise heat shrink films and/or could be applied by a vacuum technique. The use of lens portions with different focal lengths will inevitably generate sagittal differences where the different lens portions meet. The use of known manufacturing techniques would smooth these out, without significantly affecting the optical properties. Note that in general the rear surface will be smooth and often will be surfaced to adjust for the overall prescription for a particular individual.

Figure 4:
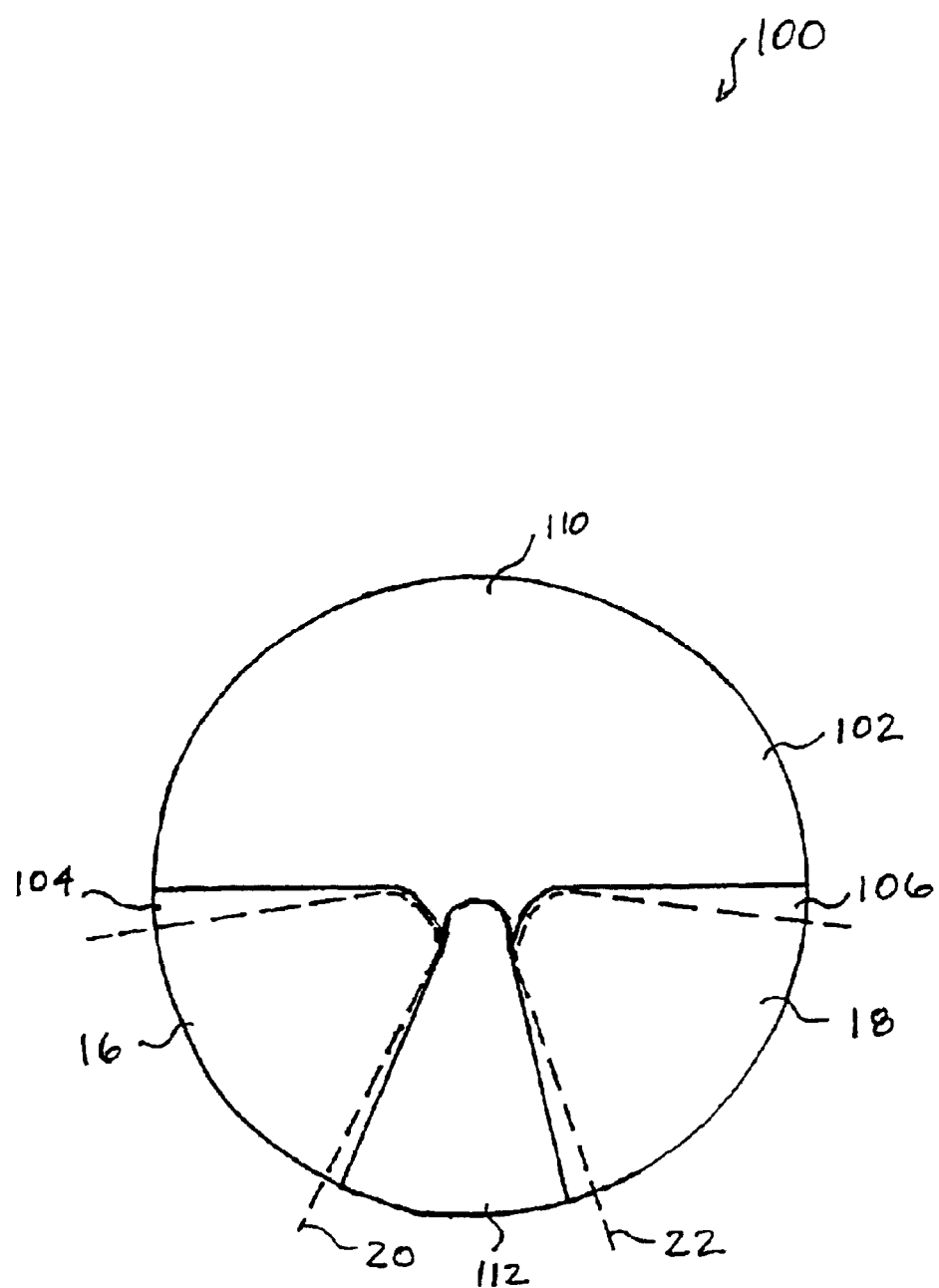
FIG. 4 is a plan view of a lens in accordance with a second embodiment of the present invention.

Referring back to FIG. 2, the O-ring 34 is fitted into grooves 32 and 44 to surround lens 10 and help hold lens 10 together. Reference is now made to FIG. 4, which shows a lens 100 in accordance with another preferred embodiment of the present invention. Lens 100 is a progressive lens, and comprises a primary lens piece 102, a nose-side lens piece 104 and an ear-side lens-piece 106. Primary lens piece 102 contains a long-distance focal region 110 in the upper portion and a progressive focal region 112 in the lower central portion.

Critical regions 16 and 18, which are defined by dashed lines 20 and 22, are the areas that, as discussed above, typically have high distortion and cause discomfort to the wearer because of their peripheral location in the field of view. Distortion is eliminated in critical regions 16 and 18 by making nose-side lens piece 104 and ear-side lens piece 106 with the constant focal properties and preferably the same focal properties as long distance lens portion 110 so that no discomfort is caused to the wearer, and also making them slightly larger than areas that can cause discomfort and distortion. All of the critical regions 16, 18 and the pieces 104 and 106 are partially defined by radii of the lens 100 and terminate short of the center of the lens 100. The separate pieces 104, 106 enable separate focal properties to be selected.

Nose-side lens piece 104 is on the side of lens 100 closest to the nose of the wearer, while ear-side lens piece 106 is on the side of the lens closest to the ear of the wearer. While nose-side lens piece 104 is shown in FIG. 4 on the right side of lens 100, and ear-side lens piece 106 is shown on the left, their positions are selected for illustrative purposes only, and their positions would be reversed for a lens worn over the other eye of the wearer.

Also, the progressive focal region is preferably not exactly centrally located, but instead is slightly nasal, corresponding to sight lines when the eyes are in a reading position. Thus, the progressive lens piece 14 can provide a rear optical center 15 that is offset nasally. The lines 20, 22 delineating the critical regions are, as indicated, generally radial (except close to the distance optical center 11). For the nose-side or nasal lens piece these radii could be at an angle 5° above the horizontal and 60° below the horizontal, while for the ear side or temporal lens piece they could have angles of 5° and 70° below the horizontal, with the radii centered on the distance optical center 11. The radii could also be centered on location displaced away from the distance optical center, typically downwardly and nasally displaced relative to the center 11. The lens piece 14 then provides the near optical center 15 offset nasally, as shown.

Figure 5:
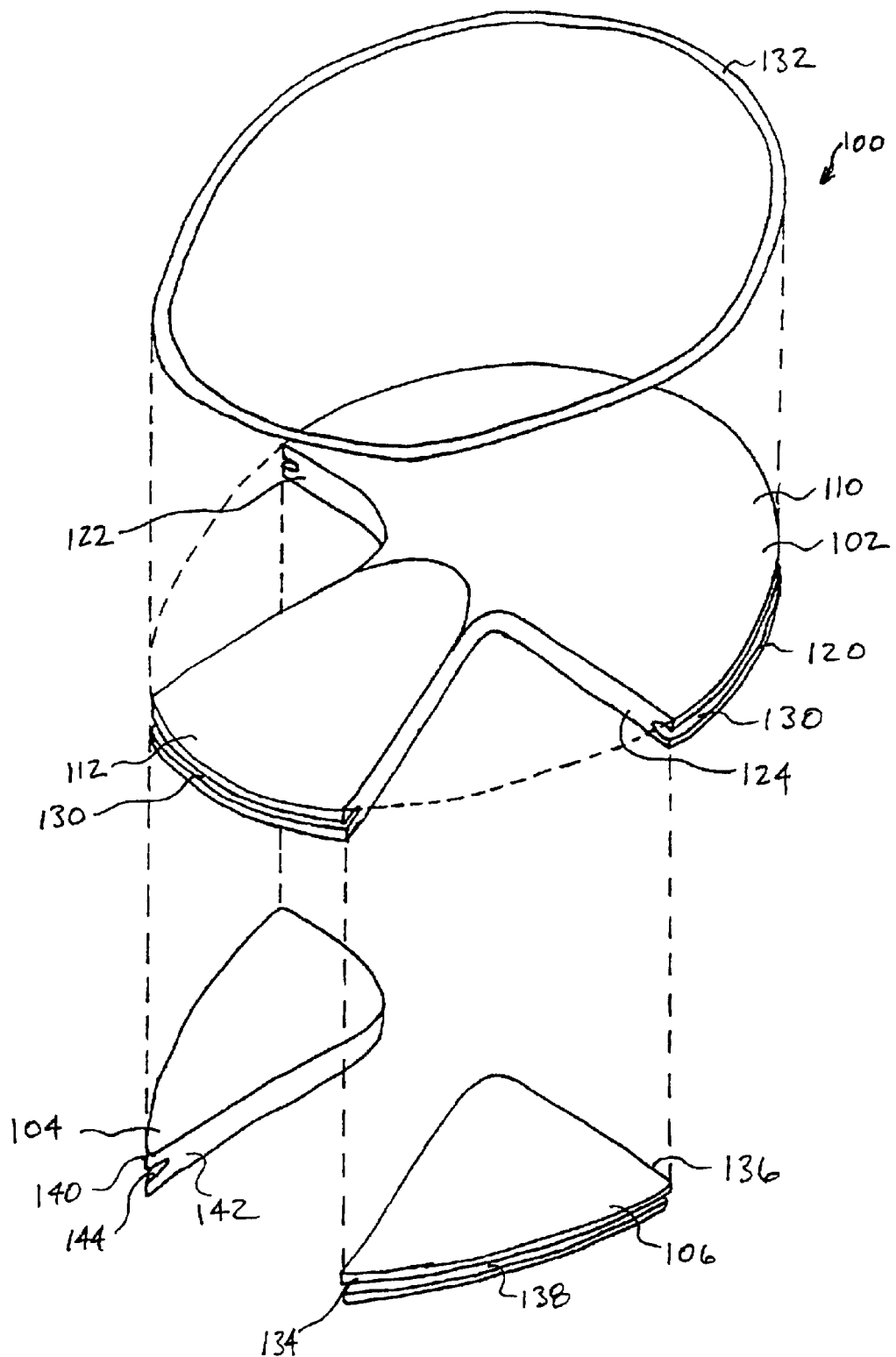
FIG. 5 is an isometric exploded view of the lens in FIG. 4.

Reference is now made to FIG. 5, which shows an isometric view of lens 100. Primary lens piece 102, nose-side lens piece 104 and ear-side lens piece 106 mount together in a similar fashion as lens pieces 12 and 14 in lens 10. Primary lens piece 102 is surrounded by an outer edge 120, which includes two mating portions 122 and 124 for mating with nose-side and ear-side lens pieces 104 and 106. A groove 130 for holding an O-ring 132, extends along the length of outer edge 120, outside of mating portions 122 and 124.

Similarly to lens piece 14, nose-side lens piece 104 is surrounded by an outer edge 134 which includes a mating portion 136 for mating with mating portion 124 of lens piece 102. A groove 138, which aligns with groove 130 on lens piece 102 for holding the O-ring 132, extends along the portion of outer edge 134 outside mating portion 136. The ear-side lens piece 106 is surrounded by an outer edge 140, which has a mating portion 142 for mating with mating portion 122, and a groove 144, which aligns with the groove 130.

The lens pieces in the above embodiments are shown as having symmetrical shapes about a vertical axis. It is preferable to have a vertically symmetrical lens for cost and for ease of manufacture, however it is alternately possible to have asymmetrical designs.

While it has been disclosed that the focal properties within the critical regions of the lenses described match the properties of the long-distance viewing portion, the lenses may alternately have other focal properties, that are different from those of the long-distance portion, but are still substantially constant throughout the critical regions.

As mentioned above, after assembly of the lens pieces, they can be covered with a film or the like to smooth out edges and ridges. Such a lens is then used to form a mold. From the mold individual lens are made. In known manner, these individual lens are used to fill prescriptions for each customer as required. For example, each lens would be cut to fit a particular eyeglass frame and, if required, the back or rear surface can be resurfaced to alter the focal length thereof.

Figure 6:
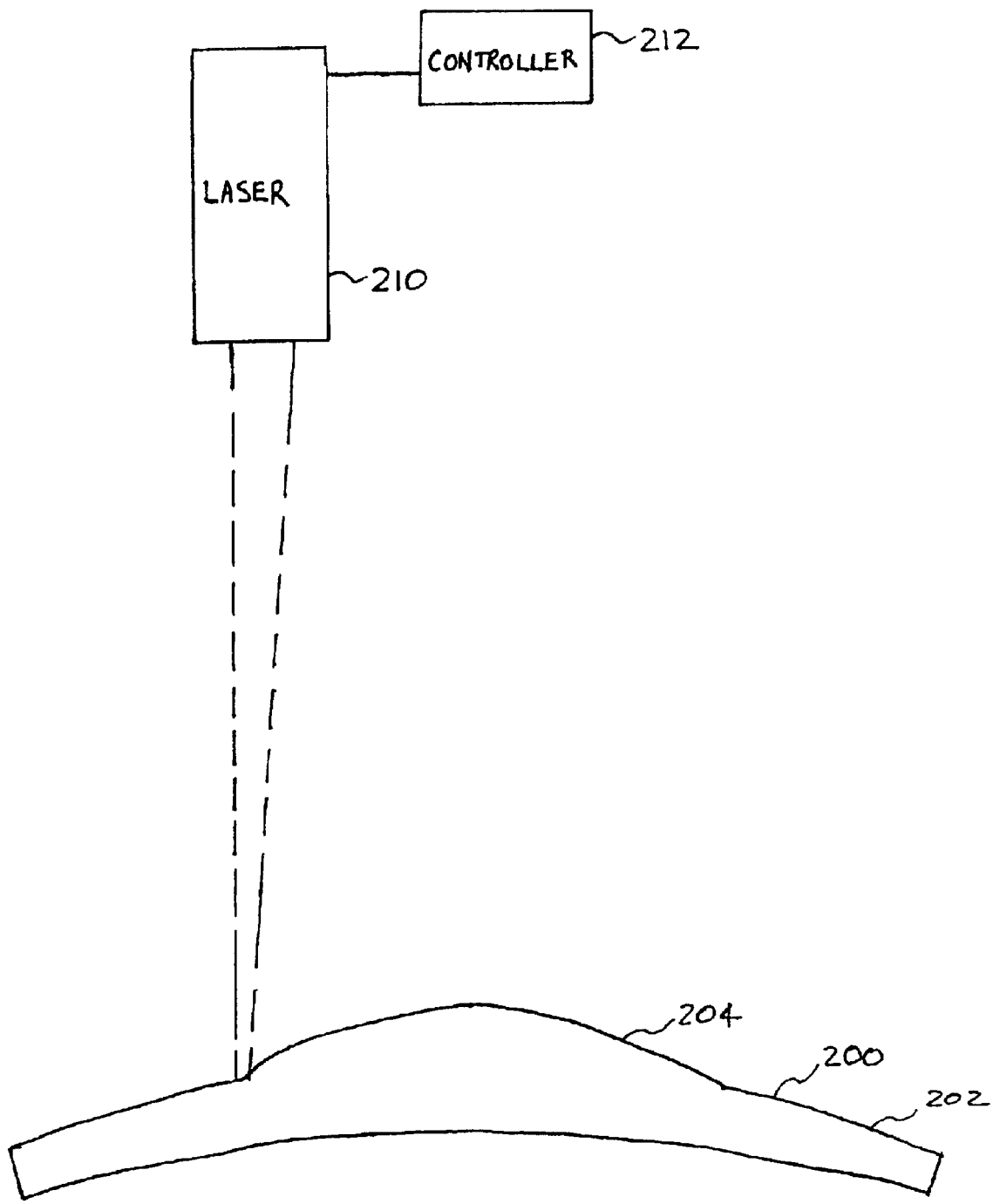
FIG. 6 is an elevation view of an apparatus for making a lens in accordance with a third embodiment of the present invention.

Reference is now made to FIG. 6, which shows an alternative manufacturing technique. FIG. 6 shows an edge view of a lens 200 manufactured in a single piece, in accordance with this aspect of the present invention. Lens 200 includes a long-distance viewing portion 202, and a progressive portion 204. Lens 200 is manufactured by the application of an excimer laser 210 to adjust the focal properties of lens 200, particularly in critical regions 16 and 18, so that lens 200 does not possess change in focal length in these regions. Excimer laser 210 is operated automatically by controller 212 to vaporize material from lens 200, and does so without damaging the remaining lens material.

While lenses have been disclosed in the above embodiments to have constant focal properties in critical regions 16 and 18, it is alternatively possible to have a progressive portion located substantially within one of the critical regions 16 and 18, thus leaving one of the critical regions 16 or 18 substantially undistorted. This provides a smaller improvement in visual comfort for the wearer, but is nonetheless an improvement within the scope of the present invention. Fabricating a lens with constant focal properties in the regions of high potential distortion reduces visual discomfort for the wearer.

As will be apparent to persons skilled in the art, various modifications and adaptations of the systems and methods described above are possible without departure from the present invention, the scope of which is defined in the appended claims.

What is claimed is:

1. A multifocal ophthalmic lens having a distance optical center, comprising:
   a first portion having first focal properties, said first focal properties being substantially constant throughout said first portion; and
   a second portion having second focal properties extending downwardly from a location adjacent the distance optical center and having a focal length that varies progressively downwardly in said second portion; and
   two regions on either side of said second portion, each of said regions having substantially constant focal properties,
   wherein said lens has a front surface that transitions smoothly between said first portion, said second portion and said two regions.

2. A multifocal ophthalmic lens as claimed in claim 1, wherein the focal properties of the two regions are substantially the same as the focal properties of the first portion.

3. A multifocal ophthalmic lens as claimed in claim 1, wherein the focal properties of at least one of the two regions is different from the first portion.

4. A multifocal ophthalmic lens as claimed in claim 1, wherein at least one of the regions has an infinite focal length.

5. A multifocal ophthalmic lens as claimed in claim 1, wherein the first and second portions are integral with one another.

6. A multifocal ophthalmic lens as claimed in claim 1, wherein the first and second portions are separate and are bonded together.

7. A multifocal ophthalmic lens as claimed in claims 5 or 6, wherein said two regions are integral with at least the first portion.

8. A multifocal ophthalmic lens having a distance optical center, comprising:
   a first portion having first focal properties, said first focal properties being substantially constant throughout said first portion; and
   a second portion having second focal properties extending downwardly from a location adjacent the distance optical center and having a focal length that varies progressively downwardly in said second portion; and
   two regions on either side of said second portion, each of said regions having substantially constant focal properties, wherein the focal properties of the two regions are different from one another.

9. A multifocal ophthalmic lens as claimed in claim 8, wherein at least one of the regions has the same focal properties as the first portion.

10. A multifocal ophthalmic lens having a distance optical center, comprising:
    a first portion having first focal properties, said first focal properties being substantially constant throughout said first portion; and
    a second portion having second focal properties extending downwardly from a location adjacent the distance optical center and having a focal length that varies progressively downwardly in said second portion; and
    two regions on either side of said second portion, each of said regions having substanially constant focal properties, wherein the two regions comprise lens pieces separately formed from the first and second portions and are secured thereto.

11. A multifocal ophthalmic lens having a distance optical center, comprising:
    a first portion having first focal properties, said first focal properties being substantially constant throughout said first portion; and
    a second portion having second focal properties extending downwardly from a location adjacent the distance optical center and having a focal length that varies progressively downwardly in said second portion; and
    two regions on either side of said second portion, each of said regions having substantially constant focal properties wherein the lens has an optical distance center and is originally substantially circular, wherein the second portion has side edges located on radii extending from the centre of the lens, and wherein said two regions have substantially straight sides located on radii extending from the centre of the lens, and wherein the two regions terminate short of the centre of the lens.

12. A method of making a multifocal ophthalmic lens for use by a wearer with a field of view containing one or more critical regions for potential visual discomfort, the method comprising the steps of:
    producing a long-distance lens piece having a peripheral edge;
    producing a progressive lens piece having a peripheral edge;
    joining said long-distance lens piece and said progressive lens piece along a portion of said peripheral edges, such that said progressive lens piece is substantially outside said critical regions.

13. A method as claimed in claim 12, wherein said joining step utilizes at least one of: a tongue and groove joint; and adhesive for joining the separate lens pieces together.

14. A method as claimed in claim 13, which includes providing a groove around the periphery of the lens and an O-ring located in the groove, for holding the lens pieces together.

15. A method as claimed in claim 14, which includes providing front and rear transparent films substantially covering said front and rear viewing surfaces of the lens.

16. A method as claimed in claim 12, which includes using the lens to produce a mold and subsequently molding an integral one-piece lens from the mold.

17. A multifocal ophthalmic lens having a distance optical center, comprising:

a first portion having first focal properties, said first focal properties being substantially constant throughout said first portion and being selected for distance viewing; and a second portion having second focal properties extending downwardly from a location adjacent the distance optical center and having a focal length that varies progressively downwardly in said second portion; and two regions on either side of said second portion, each of said regions having substantially the same focal properties as the first portions, wherein said lens has a front surface that transitions smoothly between said first portion, said second portion and said two regions.

18. A method of making a multifocal ophthalmic lens for use by a wearer with a field of view containing one or more critical regions for potential visual discomfort, the method comprising the steps of:

producing a first lens piece having a first peripheral edge, said lens piece including a long-distance viewing portion having constant focal properties and a progressive portion having a focal length that varies progressively downwardly;

producing a second lens piece having a second peripheral edge and having constant focal properties;

producing a third lens piece having a third peripheral edge and having constant focal properties; and joining said first second and third lens pieces along a portion of said first second and third peripheral edges, such that said progressive portion is substantially outside said critical regions.

19. A method as claimed in claim 18, which includes using the lens to produce a mold and subsequently molding an integral one-piece lens from the mold.

20. A multifocal ophthalmic ens having a distance optical center, comprising:

a first portion having first focal properties, said first focal properties being substantially constant throughout said first portion; and a second portion having second focal properties extending downwardly from a location adjacent the distance optical center and having a focal length that varies progressively downwardly in said second portion; and two regions on either side of said second portion, each of said regions having substantially constant focal properties, wherein at least one of the regions has an infinite focal length and wherein the first portion has a finite focal length.

\* \* \* \* \*